Dec. 30, 1952 — H. KOWALSKI — 2,623,723
PIT PROP
Filed June 14, 1950 — 2 SHEETS—SHEET 1
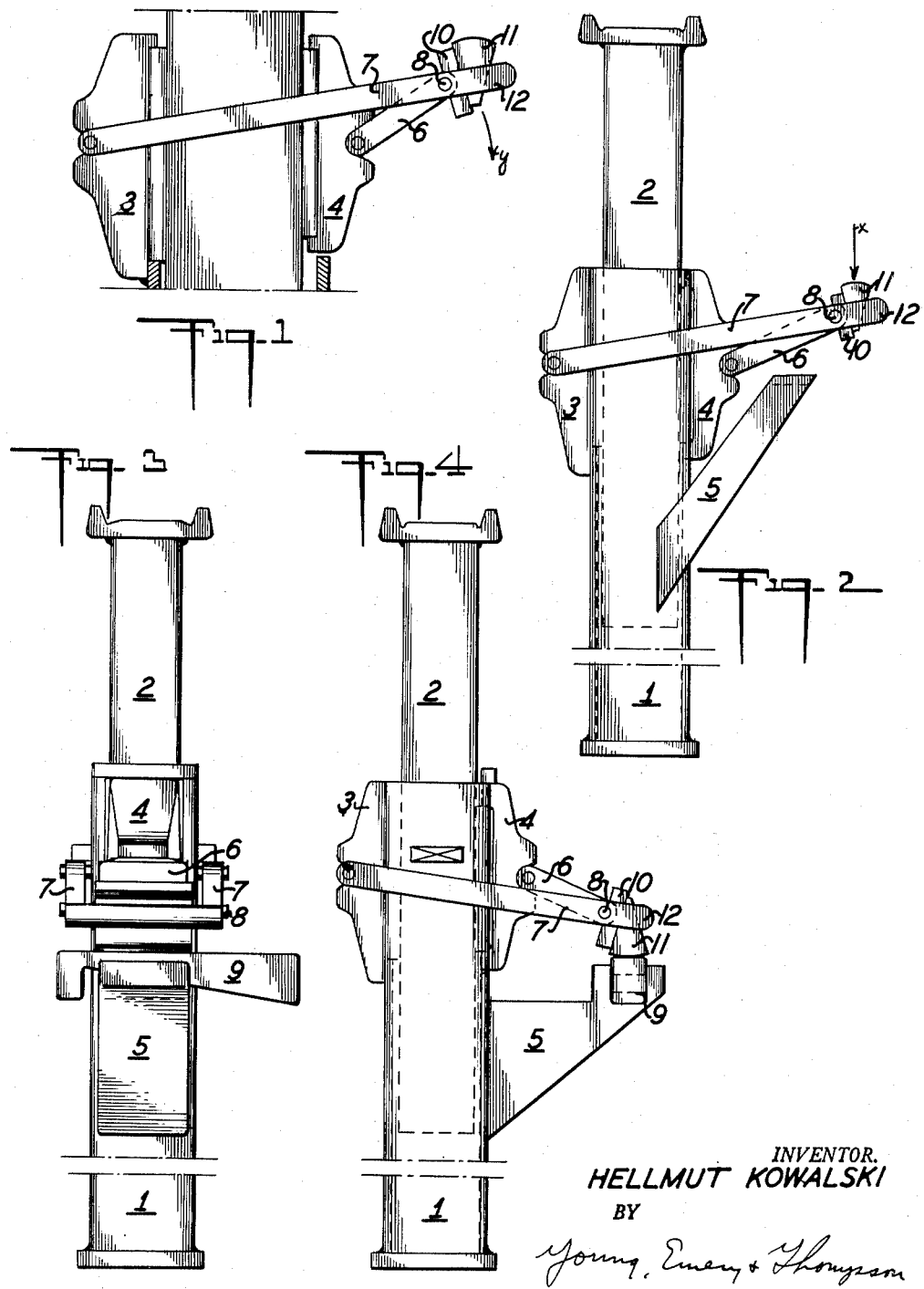
INVENTOR.
HELLMUT KOWALSKI

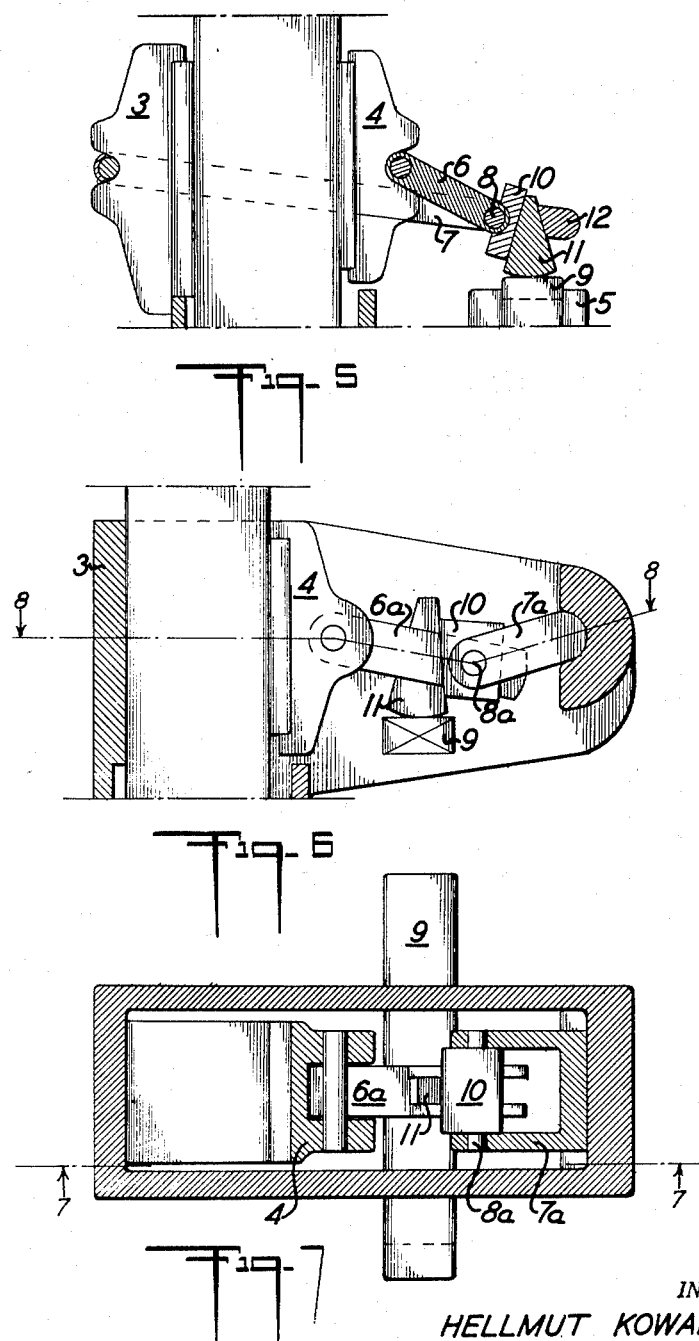

Patented Dec. 30, 1952

2,623,723

UNITED STATES PATENT OFFICE 2,623,723

PIT PROP

Hellmut Kowalski, Recklinghausen, Germany, assignor to Becorit-Grubenausbau G. m. b. H., Recklinghausen, Germany, a corporation of Germany Application June 14, 1950, Serial No. 167,947
In Germany June 25, 1949

6 Claims. (Cl. 248—354)

This invention relates to a pit prop of the type in which the pit prop parts are relatively movable with respect to each other and in which pressure jaws embracing the inner prop are clamped, if desired over a wall of the lock, against the said inner prop by means of a device comprising a toggle. The toggle is supported in the clamping position by a supporting surface of the outer prop, said surface being formed e. g. by a cross wedge. It has already been suggested to provide instead of the wedge arranged on the supporting surface a longitudinal wedge for adjusting the initial tension, said wedge being arranged between one of the toggle lever ends and the wall of the lock or a pressure jaw or friction surface adapted to be pressed against the inner prop.

According to one feature of the invention the pit props of the above mentioned type are improved thereby that the toggle joint is supported by one of the toggle levers connected with each other so as to be adjustable relatively to the other lever across the direction of its axis. In this way by changing the effective length of one lever arm the clamping force within the lock may be adapted to the desired conditions. Such adjustability of the toggle joint is of special importance with pit props in which the two opposite pressure jaws are connected with each other by a pair of differential toggle levers.

The toggle joint may be adjusted by hand, however, according to another feature of the invention, a more suitable embodiment may be obtained by guiding the toggle joint in the one lever so as to be displaceable across the direction of its axis and to support it by an adjusting member arranged in said lever and being under the counter-pressure of the supporting surface of the outer prop. The adjusting member may be formed by a wedge suitably guided between the toggle joint and a terminal projecting piece of the longer lever and resting on a supporting lug of the outer prop. When putting the pit prop in place by driving-in the horizontal wedge supported by the lug first the wedge associated to the toggle joint is pressed upwardly and thereby the effective length of the long lever of the toggle lever system is automatically adapted to the prevailing conditions. Then, when continuing to drive-in the horizontal wedge the inner prop is clamped. Tear and wear happening at the friction plates is automatically balanced by the wedge associated to the joint, penetrating deeper so that detrimental reactions adapted to diminish the clamping force are avoided.

The inner prop may be prismatic or slightly tapered in the longitudinal direction. The section of the inner prop may be box-shaped or tubular; other sections may, however, as well be used, e. g. U-shaped or double-T-sections.

Further objects and advantages of the present invention will be apparent from the following description, reference being had to the accompanying drawings wherein preferred embodiments of the present invention are clearly shown.

Figure 1 illustrates diagrammatically the mode of action of a differential toggle joint system;

Figure 2 is a side view of a pit prop;

Figure 3 is a view and

Figure 4 a side view of another pit prop;

Figure 5 illustrates a special toggle joint;

Figure 6 is a longitudinal and

Figure 7 is a cross section of another toggle joint.

According to Figure 2 of the drawing the inner prop member 2 tapering slightly in the longitudinal direction is guided in the lower prop member 1. At the upper end of the lower prop there is arranged a friction insertion, a stationary support 3 having a friction insert and in proper relative position with that support there is arranged on the opposite side of the inner prop a movably guided pressure jaw 4, which is likewise provided with a friction insert and adapted to be supported with its lower end by a stop of the lower prop. The lower prop 1 is provided, in addition, with a lateral lug 5.

The pressure jaw 4 and the friction insertion support 3 are connected by a pair of differential toggles in which the short arm 6 is rested on the pressure jaw 4 and the long arm 7 is pivoted to the friction insertion support 3. The arms 6 and 7 pivoted together at the joint 8 form an acute angle. When the prop is put in place the joint 8 is moved downwards by means of hammer blows or by applying force thereon in the direction of the arrow x—preferably beyond the dead-centre position—as far as to the supporting surface of the lug 5 whereby the inner prop 2 is clamped between the pressure jaw 4 and the friction insertion support 3 because the arms 6 and 7 have different lengths. When the location of the prop is to be changed the joint 8 is moved upwards.

There may be seen from Figure 1 of the drawing the action of the pair of toggles, viz., that when the long arm 7 is swung the end of the short arm 6 resting on the pressure jaw 4 is pressed against the inner prop in the direction of the arrow Y.

According to the embodiments of the invention as illustrated in Figures 3 and 4 of the drawing a horizontal wedge 9 is mounted on the lug 5. When the prop is put in place the toggle joint 8 is pressed upwards approximately as far as the dead centre position by driving in the wedge 9 whereby the inner prop is clamped. The horizontal wedge may be replaced by an eccentric or any other clamping device. Depending on the degree the wedge 9 is driven in the tension and with that the carrying capacity of the prop may be adjusted within certain limits. For changing the location of the prop the horizontal wedge 9 is driven back.

With a view to vary the active length of the long arm 7 the toggle joint 8 is mounted movably in the longitudinal direction of the arms 7 as may be seen from Figure 5. The joint 8 is placed in a pan-like cross piece 10, on the rear of which there is arranged a wedge 11 tapering upwards which wedge is guided on its other side along an inclined surface of terminal projecting pieces 12 of the long arms 7. The head of this wedge 11 rests against the horizontal wedge 9 of the lug 5. When the prop is put in place the wedge 11 is at first pushed upwards by driving-in the horizontal wedge 9, the joint 8 is thereby moved laterally and the active length of the arm 7 is automatically adapted to requirements. Not before a certain resistance is attained by putting the pressure jaw 4 and the friction inlet support 3 against the inner prop 4 the toggle joint system is swung and thereby the clamping of the inner prop attained.

According to the embodiment of the invention as illustrated in Figures 6 and 7 of the drawing the pair of toggle joints comprises two arms 6a and 7a which are arranged in a substantial opposite direction to each other and pivoted together at the joint 8a. The arm 6a is connected with the pressure jaw 4 whereas the free end of the arm 7a is rested against a support of the lock case. In the same way as shown in Figure 5 a wedge 11 is in contact with the toggle joint which wedge is guided between a stationary surface of the arm and a cross piece 10 movable on said arm. The cross piece 10 carries the pins of the toggle joint 8a. For the sake of adjusting a horizontal wedge 9 is movably mounted under the wedge 11 in the lock case. The mode of action is the same as that described with reference to Figure 5. The part 3 which like the pressure jaw 4 is preferably provided with a friction insertion (consisting of Silumin or the like) may be constructed in a different way; the part 3 and the lower prop may eventually constitute one piece.

What I claim is:

1. A pit prop comprising a lower prop member, an inner prop member guided in said lower prop member, opposite pressure jaws engaging said inner prop member, a pair of toggle levers connected at one end with each other by a joint and the other ends each connected to its respective pressure jaw and adapted to press said pressure jaws against the inner prop member, a supporting surface secured to the lower prop member and adapted to act as an abutment for the joint of said toggle levers when the levers are actuated to provide relative force of the pressure jaws against the inner prop member, the said joint being attached to one of said toggle levers and adjustable relative to the other of said toggle levers, and means adapted to adjust said joint relative to said last-mentioned toggle lever.

2. A pit prop comprising a lower prop member, an inner prop member guided in said lower prop member, opposite pressure jaws engaging said inner prop member, a pair of toggle levers of different lengths connected at one end with each other by a joint and the other ends each connected to its respective pressure jaw and adapted to press said pressure jaws against the inner prop member, a supporting surface secured to the lower prop member and adapted to act as an abutment for the joint of said toggle levers when the levers are actuated to provide relative force of the pressure jaws against the inner prop member, the said joint being attached to the shorter of said two toggle levers and adjustable relative to the longer toggle lever, and means adapted to adjust said joint relative to said last-mentioned toggle lever.

3. A pit prop comprising a lower prop member, an inner prop member guided in said lower prop member, opposite pressure jaws engaging said inner prop member, a pair of toggle levers connected at one end with each other by a joint and the other ends each connected to its respective pressure jaw and adapted to press said pressure jaws against the inner prop member, a longitudinal wedge engaging a supporting surface provided on the lower prop member and adapted to act as an abutment for the joint of said toggle levers when the levers are actuated to provide relative force of the pressure jaws against the inner prop member, the said joint being attached to one of said toggle levers and adjustable relative to the other of said toggle levers and means adapted to adjust said joint relative to said last-mentioned toggle lever.

4. A pit prop comprising a lower prop member, an inner prop member guided in said lower prop member, opposite pressure jaws engaging said inner prop member, a pair of toggle levers connected at one end with each other by a joint and the other ends each connected to its respective pressure jaw and adapted to press said pressure jaws against the inner prop member, a supporting surface secured to the lower prop member and adapted to act as an abutment for the joint of said toggle levers when the levers are actuated to provide relative force of the pressure jaws against the inner prop member, the said joint being attached to one of said toggle levers and adjustable relative to the other of said toggle levers, and an adjusting member continuously subject to the counter-pressure of said supporting surface and adapted to act on said joint for adjusting it relative to said last-mentioned toggle lever.

5. A pit prop comprising a lower prop member, an inner prop member guided in said lower prop member, opposite pressure jaws engaging said inner prop member, a pair of toggle levers connected at one end with each other by a joint and adapted to press said pressure jaws against the inner prop member, one of said toggle levers being pivotally secured to one of the jaws and the other abutting against the other of the jaws, a supporting surface secured to the lower prop member and adapted to act as an abutment for the joint of said toggle levers when the levers are actuated to provide relative force of the pressure jaws against the inner prop member, the said joint being attached to one of said toggle levers and adjustable relative to the other of said toggle levers, and a wedge continuously subject to the counter-pressure of said supporting surface and adapted to act on said joint for adjusting it relative to said last-mentioned toggle lever.

6. A pit prop comprising a lower prop member, an inner prop member guided in said lower prop member, opposite pressure jaws engaging said inner prop member, a pair of toggle levers of different lengths connected at one end with each other by a joint and adapted to press said pressure jaws against the inner prop member, a supporting surface secured to the lower prop member and adapted to act as an abutment for the joint of said toggle levers when the levers are actuated to provide relative force of the pressure jaws against the inner prop member, the said joint being attached to shorter of said toggle levers adjustable relative to the other of said toggle levers, terminal projections provided on the longer of said toggle levers, and a wedge arranged between said projections and the joint of the toggle levers and continuously subject to the counter-pressure of said supporting surface.

HELLMUT KOWALSKI.

REFERENCES CITED

The following references are of record in the file of this patent:

UNITED STATES PATENTS

| Number | Name | Date |
|---|---|---|
| 1,084,236 | Giderits et al. | Jan. 13, 1914 |
| 1,742,634 | Bosco | Jan. 7, 1930 |
| 2,445,543 | Thines | July 20, 1948 |